United States Patent
Sun

(10) Patent No.: US 10,649,652 B2
(45) Date of Patent: May 12, 2020

(54) METHOD OF DISPLAYING INTERFACE OF MOBILE DEVICE AND MOBILE DEVICE

(71) Applicant: SAMSUNG ELECTRONICS CO., LTD., Suwon-si (KR)

(72) Inventor: Weiwei Sun, Tianjin (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 445 days.

(21) Appl. No.: 14/937,434

(22) Filed: Nov. 10, 2015

(65) Prior Publication Data

US 2016/0132236 A1 May 12, 2016

(30) Foreign Application Priority Data

Nov. 12, 2014 (CN) .......................... 2014 1 0635844
Aug. 6, 2015 (KR) ........................ 10-2015-0111208

(51) Int. Cl.
G06F 3/048 (2013.01)
G06F 3/0488 (2013.01)
H04W 4/12 (2009.01)
G06F 3/0481 (2013.01)

(52) U.S. Cl.
CPC ........ G06F 3/04886 (2013.01); G06F 3/0481 (2013.01); G06F 3/04883 (2013.01); H04W 4/12 (2013.01); G06F 2203/04803 (2013.01)

(58) Field of Classification Search
CPC .................................................... G06F 1/1647
See application file for complete search history.

(56) References Cited

U.S. PATENT DOCUMENTS

| 6,424,743 B1 * | 7/2002 | Ebrahimi ............ G06F 3/04883 382/179 |
| 8,412,278 B2 | 4/2013 | Shin et al. |
| 8,769,431 B1 * | 7/2014 | Prasad .................... G06F 3/048 715/764 |
| 9,596,340 B2 * | 3/2017 | Noda ................ H04M 1/72519 |
| 2007/0204235 A1 * | 8/2007 | Gudi ................ H04M 1/72547 715/774 |

(Continued)

FOREIGN PATENT DOCUMENTS

| CN | 201063675 Y | 5/2008 |
| CN | 102346621 A | 2/2012 |

(Continued)

OTHER PUBLICATIONS

Communication dated Apr. 18, 2016, issued by the State Intellectual Property Office of P.R. China in counterpart Chinese application No. 201410635844.3.

*Primary Examiner* — Mohamed Abou El Seoud
(74) *Attorney, Agent, or Firm* — Sughrue Mion, PLLC

(57) ABSTRACT

Provided are a method of displaying an interface of a mobile device including a touch screen and a mobile device performing the method. The mobile device includes a touch screen having a first area and a second area. The method includes receiving, when the first and second areas are locked during a phone call state of the mobile device, an input function activation signal, and displaying, in the second area, an interface comprising a plurality of operation keys related to the phone call state, according to the received input function activation signal.

19 Claims, 19 Drawing Sheets

(56) References Cited

U.S. PATENT DOCUMENTS

| | | | | |
|---|---|---|---|---|
| 2009/0305731 A1* | 12/2009 | Kim | ................. | H04L 29/12896 |
| | | | | 455/466 |
| 2010/0240402 A1* | 9/2010 | Wickman | ................ | H04M 1/57 |
| | | | | 455/466 |
| 2011/0117941 A1* | 5/2011 | Zhang | .................... | H04W 8/24 |
| | | | | 455/466 |
| 2013/0321314 A1* | 12/2013 | Oh | .......................... | G06F 3/041 |
| | | | | 345/173 |
| 2014/0013276 A1* | 1/2014 | Butterworth | ........ | G06F 3/04886 |
| | | | | 715/821 |
| 2017/0097715 A1* | 4/2017 | Kim | ................. | H04M 1/72583 |

FOREIGN PATENT DOCUMENTS

| | | |
|---|---|---|
| CN | 102830926 A | 12/2012 |
| CN | 103067570 A | 4/2013 |
| KR | 10-0835962 B1 | 6/2008 |

* cited by examiner

METHOD OF DISPLAYING INTERFACE OF MOBILE DEVICE AND MOBILE DEVICE

CROSS-REFERENCE TO RELATED APPLICATIONS

This application claims the benefit of Chinese Patent Application No. 201410635844.3, filed on Nov. 12, 2014, in the State Intellectual Property Office of P.R.C., and Korean Patent Application No. 10-2015-0111208, filed on Aug. 6, 2015, in the Korean Intellectual Property Office, the disclosures of which are incorporated herein in their entireties by reference.

BACKGROUND

1. Field

The present disclosure relates to a method of displaying a user interface on a mobile device including a touch screen, and a mobile device using the method.

2. Description of the Related Art

A recently developed mobile device includes a touch screen panel (TSP) that allows a user to more conveniently input necessary information to the mobile device in comparison to using keys on a keypad.

Also, such mobile device may allow or disallow processing of touch signals input via a touch screen during a phone call, and thus, an input may be disallowed even when the face of the user contacts the mobile device. Since a locked state of the touch screen is maintained during a phone call, the user has to unlock the touch screen to input a memo.

However, until recently, even when a touch screen of a mobile device is divided into a plurality of areas, a user had to activate the entire touch screen of the mobile device in order to input a memo during a phone call. Also, when there is a cover on the mobile device, the user has to input information after opening the cover first.

Therefore, it is necessary to display a different interface in each area of the touch screen during a phone call, thereby allowing the mobile device to perform various operations more efficiently.

SUMMARY

Exemplary embodiments provide a method of displaying an interface regarding a phone call state in a second area among two areas of a touch screen of a mobile device when an input function activation signal is received from a user while both areas of the touch screen are in a locked state, and a mobile device using the method.

Exemplary embodiments provide a method of displaying, during a service call state, text and service content corresponding to a plurality of menus on a second area, and a mobile device.

Additional aspects will be set forth in part in the description which follows and, in part, will be apparent from the description, or may be learned by practice of the presented exemplary embodiments.

According to an aspect of an exemplary embodiment, a method of displaying an interface of a mobile device including a touch screen having a first area and a second area, the method includes receiving, when the first and second areas are locked during a phone call state of the mobile device, an input function activation signal, and displaying, in the second area, an interface including a plurality of operation keys related to the phone call state, according to the received input function activation signal.

When the interface is displayed in the second area, the first area may be maintained in a locked state.

The first area may be located on a front surface of the mobile device and the second area may be located on at least one side of the mobile device.

According to a user's input related to the second area, content on the interface displayed in the second area may be emphasized.

The plurality of operation keys may include at least one function key and at least one text key, and the interface displayed in the second area may include a first window including the at least one function key and a second window including the at least one text key.

The interface displayed in the second area may be adjusted based on at least one of a size of the second area, a shape of the second area, and a location of the second area on the mobile device.

When the mobile device is set in a one-hand operation mode, frequently used operation keys from among the plurality of operation keys may be distinguishably displayed in the second area.

The interface displayed in the second area may include a handwriting input zone for receiving a handwriting input.

A direction of the interface displayed in the second area may change as the mobile device rotates in a horizontal or vertical direction.

When the phone call state is a service call state for using a service including a plurality of menus, the interface may display at least one of text and service content corresponding to the plurality of service menus.

A sequence key may be displayed on the interface, and the method may further include performing an operation corresponding to the sequence key according to a user's input.

Information corresponding to the sequence key may be transmitted to a mobile device of a calling partner.

When a name of service content displayed on the interface is not displayed at once, the name of the service content may move in a first direction and may be repeatedly displayed.

The first window and the second window may overlap each other.

The interface may include an axis related to the plurality of operation keys, and the displaying of the interface may include displaying at least one of the plurality of operation keys according to a user's input provided on the axis.

The displaying of the interface may include displaying, according to a sliding input performed by a user on the second area, a new function key other than the at least one function key and a new text key other than the at least one text key in at least one of the first window and the second window.

According to an aspect of another exemplary embodiment, a mobile device includes a touch screen having a first area and a second area, and a controller configured to detect an input function activation signal when the first and second areas are locked during a phone call state of the mobile device, and when the input function activation signal is detected, to control the touch screen to display an interface including a plurality of operation keys related to the phone call state in the second area while maintaining a locked state of the first area.

The first and second areas may be physically separated touch screens or a physically coupled touch screen.

When the touch screen may be covered by a cover, the second area may correspond to a window in the cover.

According to an aspect of another exemplary embodiment, a non-transitory computer-readable recording medium having recorded thereon a program, which, when executed by a computer, performs the above-described method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
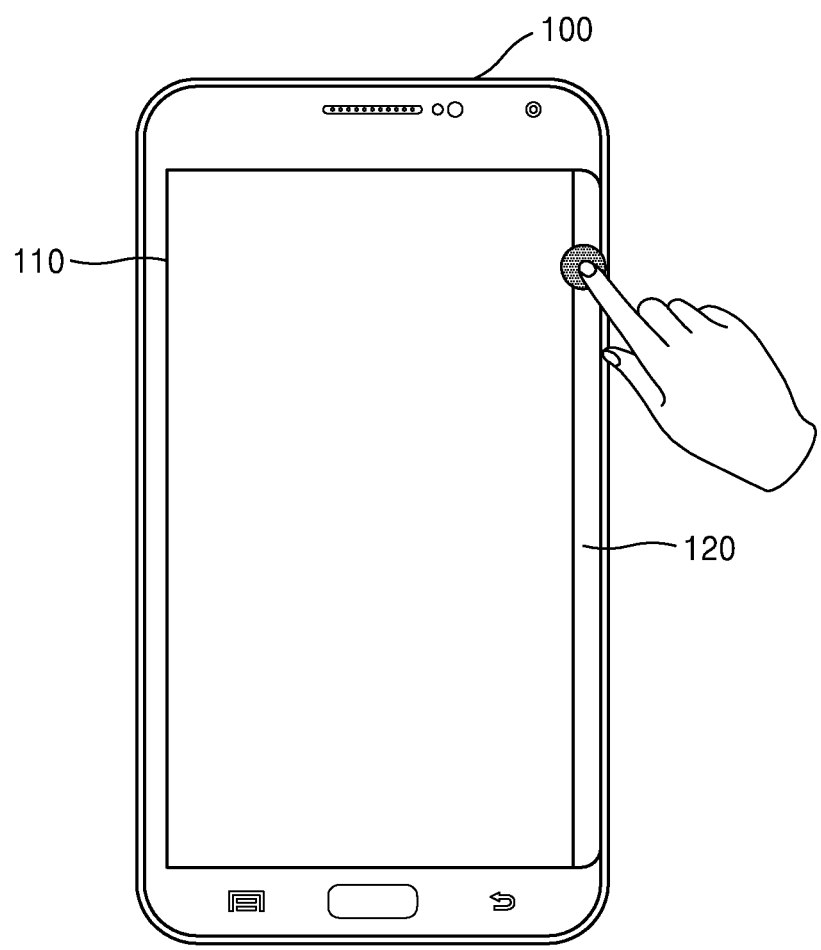
FIGS. 1A and 1B illustrate an example in which a mobile device receives a user's input during a phone call, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Figure 1B:
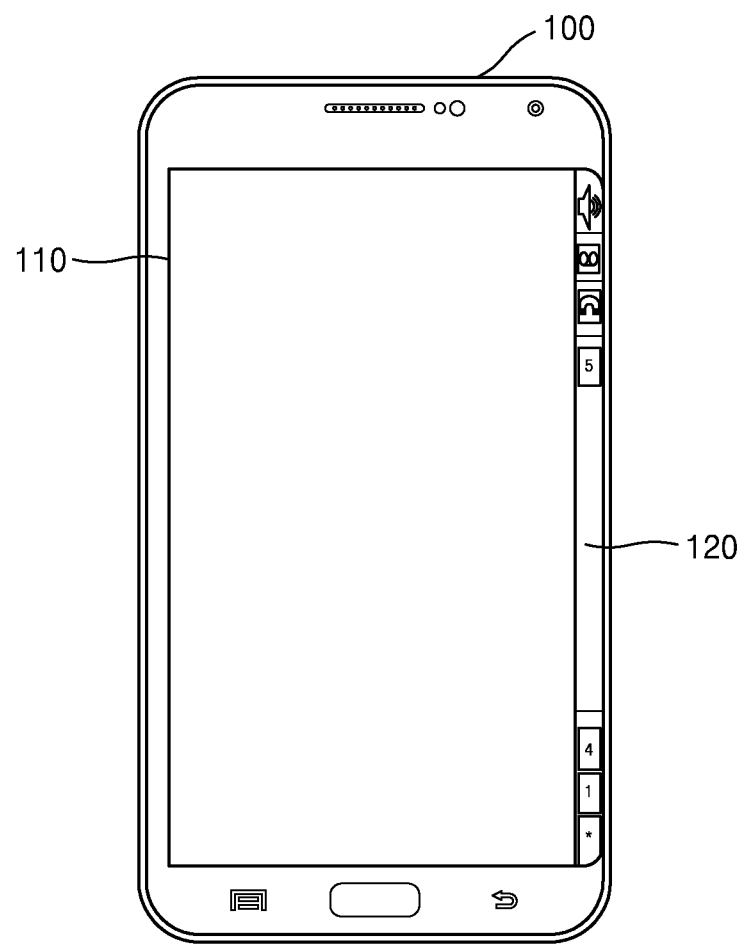

A mobile device 100 shown in FIGS. 1A and 1B may be, but is not limited to, a smartphone, a laptop computer, a tablet computer, a point of sale (POS) device, an on-board computer, a personal digital assistant (PDA), or an e-book mobile device.

According to an exemplary embodiment, the mobile device 100 may include a touch screen having at least a first area 110 and a second area 120. The first area 110 and the second area 120 may be provided in various ways. For example, the mobile device 100 may be, but is not limited to, a multi-screen slide phone, a multi-screen flip phone, a curved screen mobile phone, or a flexible mobile phone, each of which may include a touch screen having two areas.

Also, the touch screen having the first and second areas 110 and 120 may be a flat screen or a curved screen. Alternatively, the touch screen may be a flexible screen, but an exemplary embodiment is not limited thereto.

According to an exemplary embodiment, the first area 110 is larger than the second area 120. For example, the first area 110 may be a main screen area that occupies most of the touch screen. The second area 120 may be a subsidiary screen area that occupies a portion of the touch screen. Since the subsidiary screen area has a relatively small size, overall power consumption of the mobile device 100 may decrease significantly, and information of a user may be protected.

Also, an interface displayed in the second area 120 may be different from an interface displayed in the first area 110. The interface in the second area 120 is configured such that power consumption of the mobile device 100 is more efficient than the case when the interface is displayed in the first area 110. For example, the first area 110 of the touch screen may be a general liquid crystal display (LCD), and the second area 120 of the touch screen may be an e-ink screen area so that the user may operate the mobile device 100 in a bright place without being affected by reflection of light.

Also, a cover may be an object or a device used to cover the touch screen of the mobile device 100 to protect the touch screen of the mobile device 100. The cover may be electrically or non-electrically connected to the touch screen. A window of the cover refers to an area of the touch screen that may be recognized by the user when the cover is closed.

In the present disclosure, the term "touch input" refers to a touch gesture performed by the user on a touch screen or a cover to control a mobile device. For example, the touch input according to exemplary embodiments may include, but is not limited to, tapping, touching and holding, double tapping, dragging, panning, flicking, and drag and drop.

In the present disclosure, a change in an input mode refers to a change in a unit of receiving a user's input in a mobile device and a change in an operation corresponding to the received user's input. For example, when an input mode of the mobile device changes, the mobile device may activate or deactivate some sensors that receive the user's input. Also, for example, the mobile device may differently interpret an identical user's input according to input modes and perform different operations according to input modes.

In the present disclosure, the term "shortcut interface" refers to a phone call interface displayed in a second area during a phone call.

Hereinafter, the exemplary embodiments will be described with reference to the accompanying drawings.

FIGS. 1A and 1B illustrate an example in which the mobile device 100 receives a user's input during a phone call, according to an exemplary embodiment;

Referring to FIGS. 1A and 1B, the mobile device 100 may include the first and second areas 110 and 120. The first and second areas 110 and 120 may independently perform operations according to a user's input. For example, the first area 110 may be a main screen area used by the user to perform a majority of functions, and the second area 120 may be a side screen area for performing functions different from those performed in the first area 110, such as new message notification.

Also, the first and second areas 110 and 120 may be physically spaced apart. When the first and second areas 110 and 120 are physically spaced apart, the first and second areas 110 and 120 may be coupled to each other in various ways. Alternatively, the first and second areas 110 and 120 may be physically combined to form one screen area.

Also, the first area 110 may be located on a front surface of the mobile device 100, and the second area 120 may be located on at least one side of the mobile device 100. Although FIG. 1A illustrates that the second area 120 is at a right edge of the mobile device 100, the second area 120 may be located on, but is not limited to, a left edge, a top edge, a bottom edge, or a plurality of edges of the mobile device 100.

Also, the first area 110 may be a main screen area of the mobile device 100, and the second area 120 may be a portion of the main screen area corresponding to a window in a cover of the mobile device 100 when the cover is closed.

Alternatively, the first area 110 may be a main screen area of the mobile device 100, and the second area 120 may correspond to a wearable device (e.g., a smart watch) that may be used together with the mobile device 100.

Alternatively, when the mobile device 100 has an e-ink screen on its back side, the first area 110 may be a main screen area of the mobile device 100 and the second area 120 may be the e-ink screen area.

Referring to FIG. 1A, in order to prevent malfunctioning of the mobile device 100 due to unintentional contact of the user with the touch screen during a phone call, the mobile device 100 maintains the first and second areas 110 and 120 of the touch screen in a locked state.

When the mobile device 100 receives an input function activation signal according to a user's input, as shown in FIG. 1B, the second area 120 displays a phone call interface including a plurality of operation keys. The plurality of operation keys may include at least one function key and at least one text key. The function key may include, but is not limited to, a speaker key, a call end key, and a record key. The text key indicates a key for inputting numbers, text, and symbols.

Also, the phone call interface shown on the second area 120 may include a first window including the at least one function key and a second window including at least one text key.

According to an exemplary embodiment, the input function activation signal may be received when the face of the user moves away from the mobile device 100, when a predetermined operation or gestures is performed, when an earphone is inserted, or the cover of the mobile device 100 is opened. However, exemplary embodiments are not limited to the above.

The mobile device 100 may include one or more sensors to detect whether the face of the user is moving away from the mobile device 100. The sensor may include, but is not limited to, a distance sensor, an infrared (IR) sensor, a brightness sensor, and a face proximity sensor based on electrostatic detection of a touch screen.

The performing of a predetermined operation or gesture may include, but is not limited to, pressing a power button and a volume button for a long time. For example, when the user is having a phone call without using his/her hand, the user has to unlock the second area 120 by pressing a predetermined button to input information. In this case, an operation of unlocking the first area 110 may be omitted. In addition, the performing of a predetermined operation or gesture may include sweeping over the second area 120 by using a hand, shaking the mobile device 100, or tapping the second area 120 two or more times.

Figure 2:
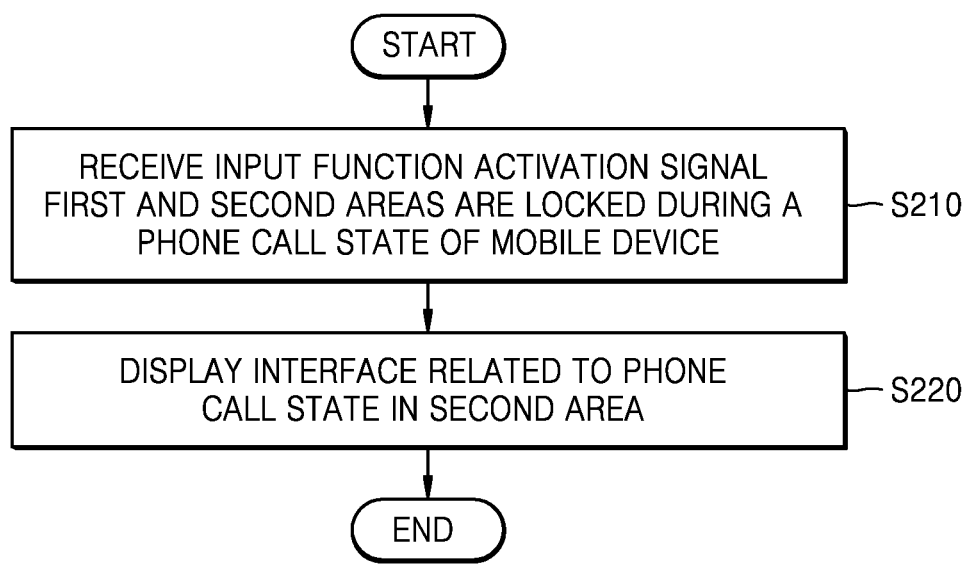
FIG. 2 is a flowchart of a method of displaying, during a phone call, an interface in a second area based on an input function activation signal, the method being performed by a mobile device, according to an exemplary embodiment.

FIG. 2 is a flowchart of a method of displaying, during a phone call, an interface in the second area 120 based on an input function activation signal, the method being performed by the mobile device 100, according to an exemplary embodiment.

In operation S210, when the first and second areas 110 and 120 are locked during a phone call state of the mobile device 100, the mobile device 100 may receive an input function activation signal.

In operation S220, based on the received input function activation signal, the mobile device 100 may display a phone call interface in the second area 120. The phone call interface is used to perform a function related to the phone call or receive information from the user.

Since the phone call interface is provided in the second area 120, the user may input information or perform various functions related to the phone call, while maintaining the first area 110 to be in a locked state. When the second area 120 is smaller than the first area 110, only the second area 120 is used and power is efficiently consumed, and thus, overall power consumption of the mobile device 100 may decrease significantly.

Also, when the user does not have to use a shortcut interface in the second area 120, the second area 120 may be locked according to a predetermined operation performed by the user. For example, when the user has to use the first area 110 to send a text message or write a memo, the user may perform a predetermined operation to lock the second area 120. The predetermined operation may include, but is not limited to, pressing a button, a gesture command, and a voice command.

The displaying of the phone call interface may include, but is not limited to, adjusting the interface based on at least one of an operation mode of the user, a shape of the second area 120, and a location of the second area 120 on the mobile device 100. The adjusting of the interface may include adjusting displayed content and locating the interface.

The operation mode of the user may include a one-hand operation mode, a handwriting mode, a vertical mode, a horizontal mode, etc. Adjusting of the interface based on a size of the second area 120 may include, but is not limited to, adjusting the interface based on zones of the second area 120 and adjusting a size of an operation key in each of the zones. For example, the second area 120 may be equally divided into 10 or 12 portions with regard to a size of the touch screen. When the number of operation keys to be displayed is less than the number of operations keys that can be displayed, operation keys that are not displayable may be displayed according to a sliding input of the user. Specifically, when a text key zone of the second area 120 is equally divided into 10 portions with regard to the size of the touch screen and displaying 10 text keys, numbers 0 to 9 may be displayed as a default, and keys such as "*," "#," etc. may be displayed by sliding other text keys or other methods.

The adjusting of the interface based on the shape of the second area 120 indicates that content may be differently displayed depending on the shape of the second area 120. For example, the second area 120 may have a vertically long shape, a horizontally long shape, or a quadrilateral shape based on a window of a cover of the mobile device 100. Therefore, the interface in the second area 120 may be displayed based on the shape of the second area 120.

The adjusting of the interface based on the location of the second area 120 on the mobile device 100 may include arranging frequently used operation keys according to the location of the second area 120 so as to promote the user's convenience.

Figure 3A:
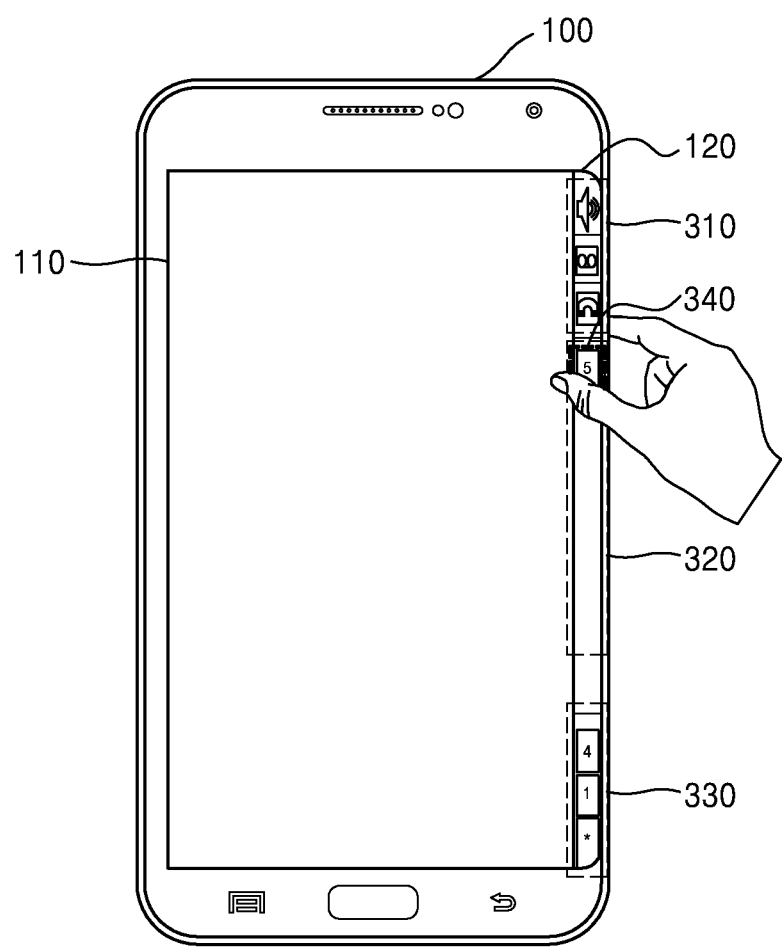
FIGS. 3A and 3B illustrate an example in which, when a one-hand operation mode is set, frequently used operation keys are displayed in a second area, according to an exemplary embodiment.
Figure 3B:
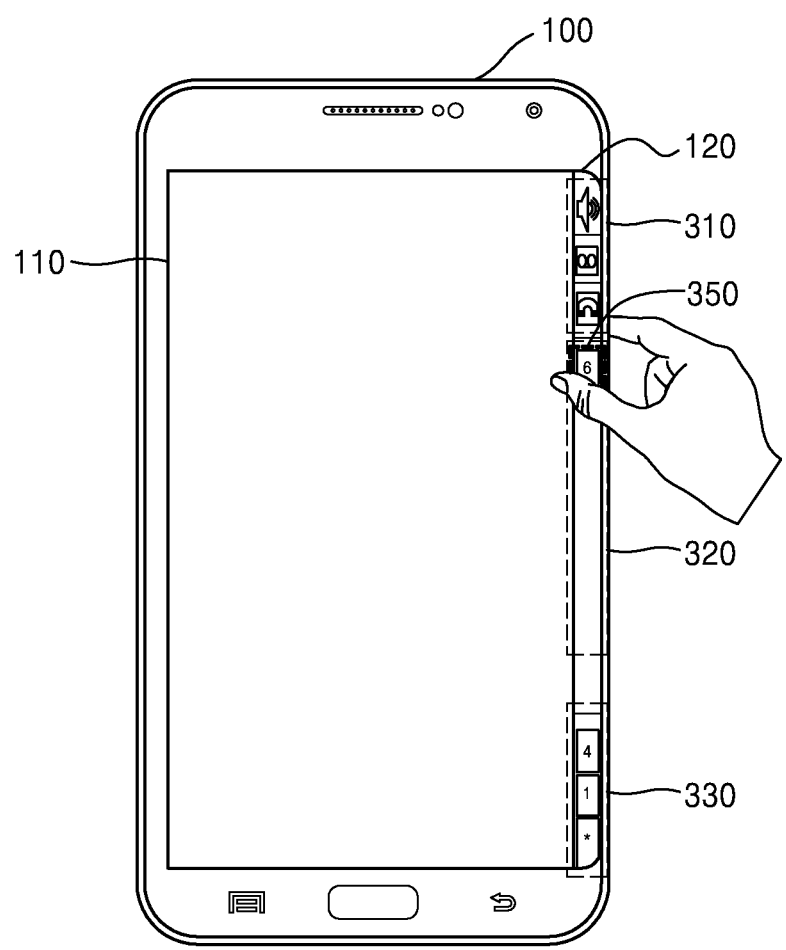

FIGS. 3A and 3B illustrate an example in which, when a one-hand operation mode is set, frequently used operation keys are displayed on the second area 120, according to an exemplary embodiment.

When the user sets a one-hand operation mode or the mobile device 100 detects the one-hand operation mode, an interface of the one-hand operation mode is displayed on the second area 120.

Referring to FIG. 3A, frequently used operation keys of a shortcut interface is arranged in a portion of the second area 120 which may be easily used by one hand according to the user's habits. The portion that may be easily used by one hand may be located in various places depending on the location and the size of the second area 120. For example, when the second area 120 is in a vertical mode, function keys may be displayed in an upper end 310, text keys may be displayed in a middle portion 320, and an input content display zone may be displayed in a lower end 330.

Also, in order to thoroughly utilize the second area 120, the text keys may be displayed according to a sliding input of the user. For example, when the text keys include 12 characters such as the numbers 0 to 9, "*," and "#", 3 text keys may be provided.

In particular, a first text key may be related to the numbers 0 to 4, a second text key may be related to the numbers 5 to 9, and a third text key may be related to "*," "#," or other general characters. The text keys may be configured such that the user may quickly find a character. For example, as shown in FIG. 3A, when a text key 340 displays the number "5" and the user performs a sliding input on the text key 340 to input the number "6," a text key 350 may be changed to the number "6" as shown in FIG. 3B.

Also, in order to prevent the mobile device 100 from receiving signals that are unintentionally input by the user, the lower end 330 of the second area 120 may be set as a non-touchable zone. Alternatively, based on the user's input, an input content display zone may be set to display at least one character.

Figure 4:
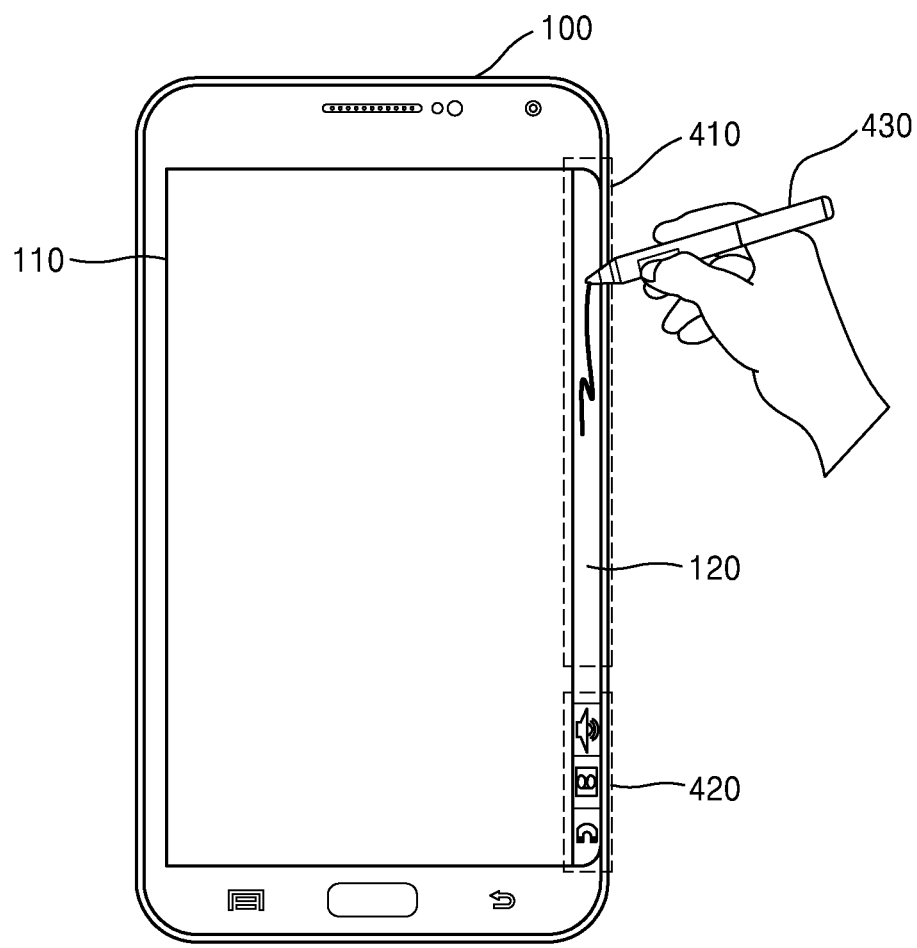
FIG. 4 illustrates an example in which, when a handwriting mode is set, a handwriting input zone is displayed in a second area, according to an exemplary embodiment handwriting mode.

FIG. 4 illustrates an example in which, when a handwriting mode is set, a handwriting input zone 410 is displayed on the second area 120, according to an exemplary embodiment handwriting mode.

When the user sets the handwriting mode or the mobile device 100 detects the handwriting mode, an interface of the handwriting mode is displayed on the second area 120. For example, the mobile device 100 may detect the handwriting mode based on the user pulling out a pen 430 of the mobile device 100 during a phone call.

In the interface of the handwriting mode, a handwriting input zone 410 of the second area 120 may be displayed and the interface may vary according to the location and the size of the second area 120. For example, the handwriting input zone 410 may be displayed at an upper end of the second area 120 and function keys 420 may be displayed at a lower end of the second area 120.

Figure 5:
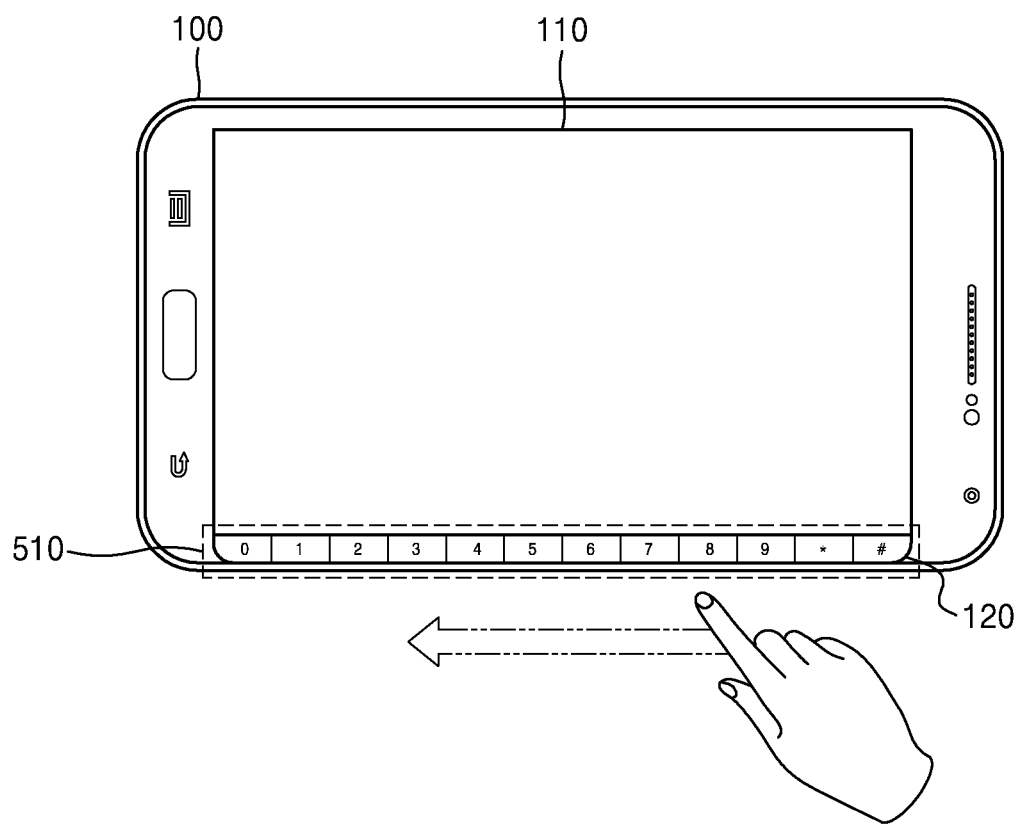
FIG. 5 illustrates an example in which a direction of an interface shown in a second area changes as a direction of a mobile device changes horizontally or vertically, according to an exemplary embodiment.

FIG. 5 illustrates an example in which a direction of an interface shown on the second area 120 changes as a direction of the mobile device 100 changes horizontally or vertically, according to an exemplary embodiment.

The mobile device 100 may change a direction of the interface in the second area 120 based on the user changing a direction of the mobile device 100 during a phone call.

Referring to FIG. 5, when the mobile device 100 is rotated to a horizontal direction, text keys 510 in the second area 120 is displayed in a horizontal direction for the user's convenience. When the user performs a sliding input on the second area 120 in a horizontal mode, the text keys 510 may move in a first direction and new text keys may be displayed. Also, text keys and function keys may be displayed together in the second area 120. The text keys and the function keys may be in the same sliding area or different sliding areas.

When the second area 120 itself is horizontally provided at an upper portion or a lower portion of the touch screen, the second area 120 may be changed to the horizontal mode even when the mobile device 100 is not horizontally rotated.

After the second area 120 is changed to the horizontal mode, when the mobile device 100 is rotated in a vertical direction or the second area 120 is displayed at the zone which has to be vertically displayed, the mobile device 100 may change a direction of the interface in the second area 120 vertically.

Figure 6A:
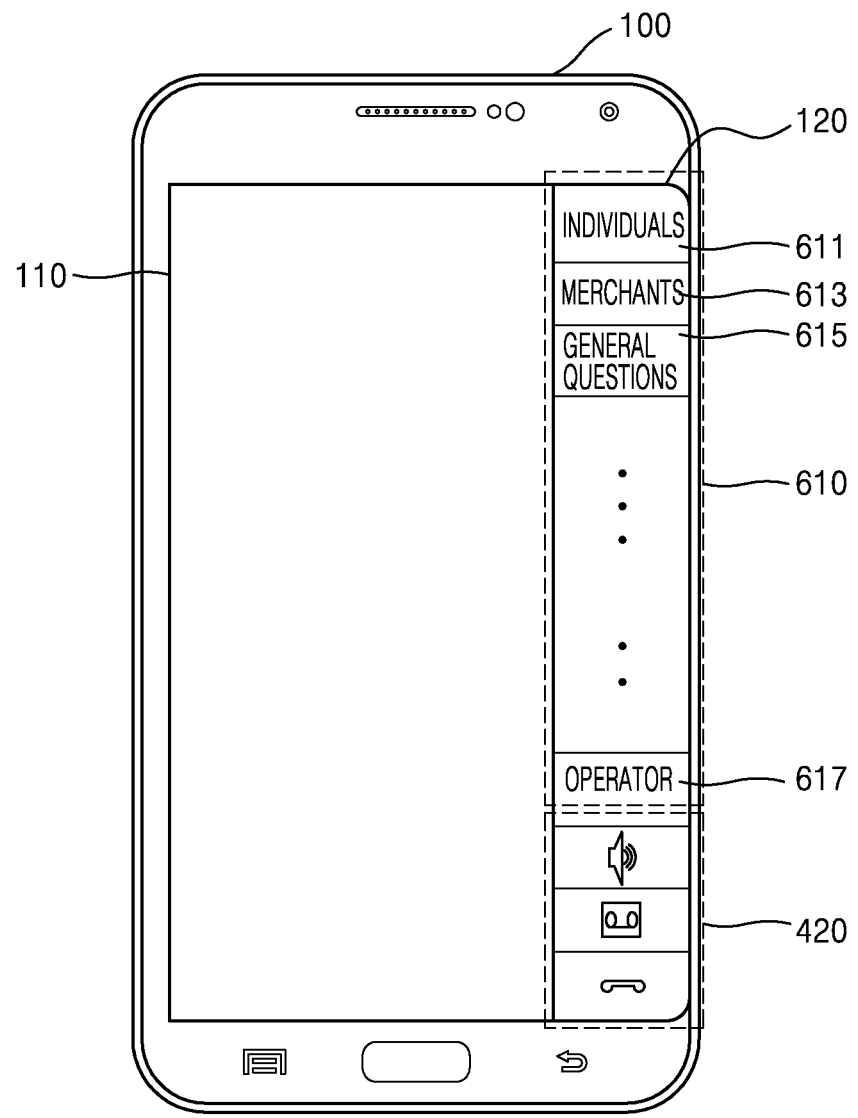
FIGS. 6A and 6B illustrate an example in which text and service content corresponding to a plurality of menus are displayed in a second area during a service phone call, according to an exemplary embodiment.
Figure 6B:
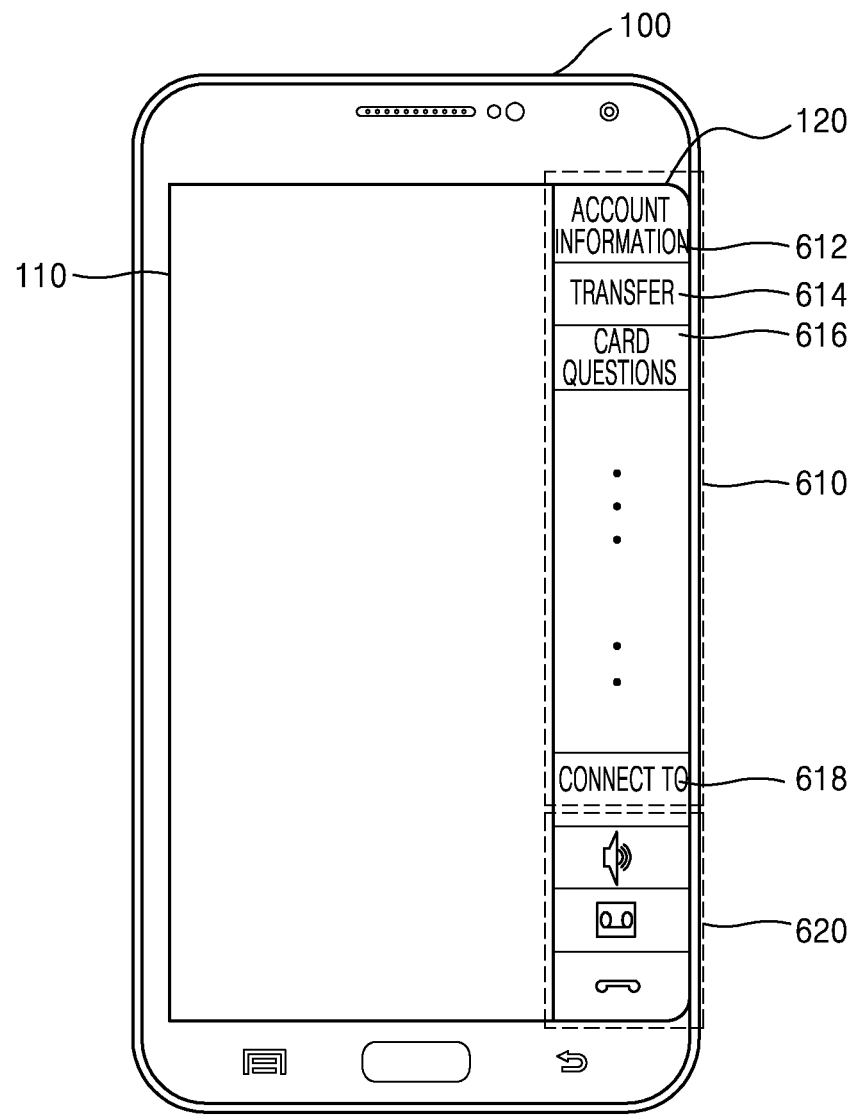

FIGS. 6A and 6B illustrate an example in which text and service content corresponding to a plurality of menus are displayed on the second area 120 during a service phone call, according to an exemplary embodiment.

Referring to FIG. 6A, when the user sets that the user is making a service call or the mobile device 100 detects that the service call is in process, a service call-related interface may be displayed in the second area 120.

With regard to the service call (e.g., an automatic response system (ARS) call), numbers and symbols are fixed to a specific service menu. Therefore, before making the service call, when service content corresponding to each of the number and symbols is stored in the mobile 100 in advance, names of the service content corresponding to the numbers and the symbols may be displayed instead of the numbers and the symbols. When a name of service content is too long to be displayed at once, the name of the service content may be configured to automatically move in a direction at a zone of a key corresponding to the service content.

For example, when the user uses an ARS service to access a customer service center of a bank and ask for information, a text key zone 610 of the second area 120 of the mobile device 100 may display 'INDIVIDUALS' 611 instead of the number 1, 'MERCHANTS' 613 instead of the number 2, 'GENERAL QUESTIONS' 615 instead of the number 3. When a name of service content, such as 'CONNECT TO OPERATOR', cannot be displayed in a single area and is shown as 'OPERATOR' 617 as in FIG. 6A, the name may move in a direction so that 'CONNECT TO' 618 is shown as in FIG. 6B. Accordingly, the name 'CONNECT TO OPERATOR' may be repeatedly displayed.

Referring to FIG. 6B, when the user selects one of displayed services, services displayed on the text key zone 610 of the second area 120 may be changed to subordinate services of the selected service. For example, when the user selects the 'INDIVIDUALS' 611, the services on the text key zone 610 may be changed to service content of a subordinate menu of the 'INDIVIDUALS' 611 service.

Therefore, in the text key zone 610, the 'INDIVIDUALS' 611 is changed to 'ACCOUNT INFORMATION' 612, the 'MERCHANTS' 613 is changed to 'TRANSFER' 614, and the 'GENERAL QUESTIONS' 615 is changed to 'CARD QUESTIONS' 616.

Figure 7:
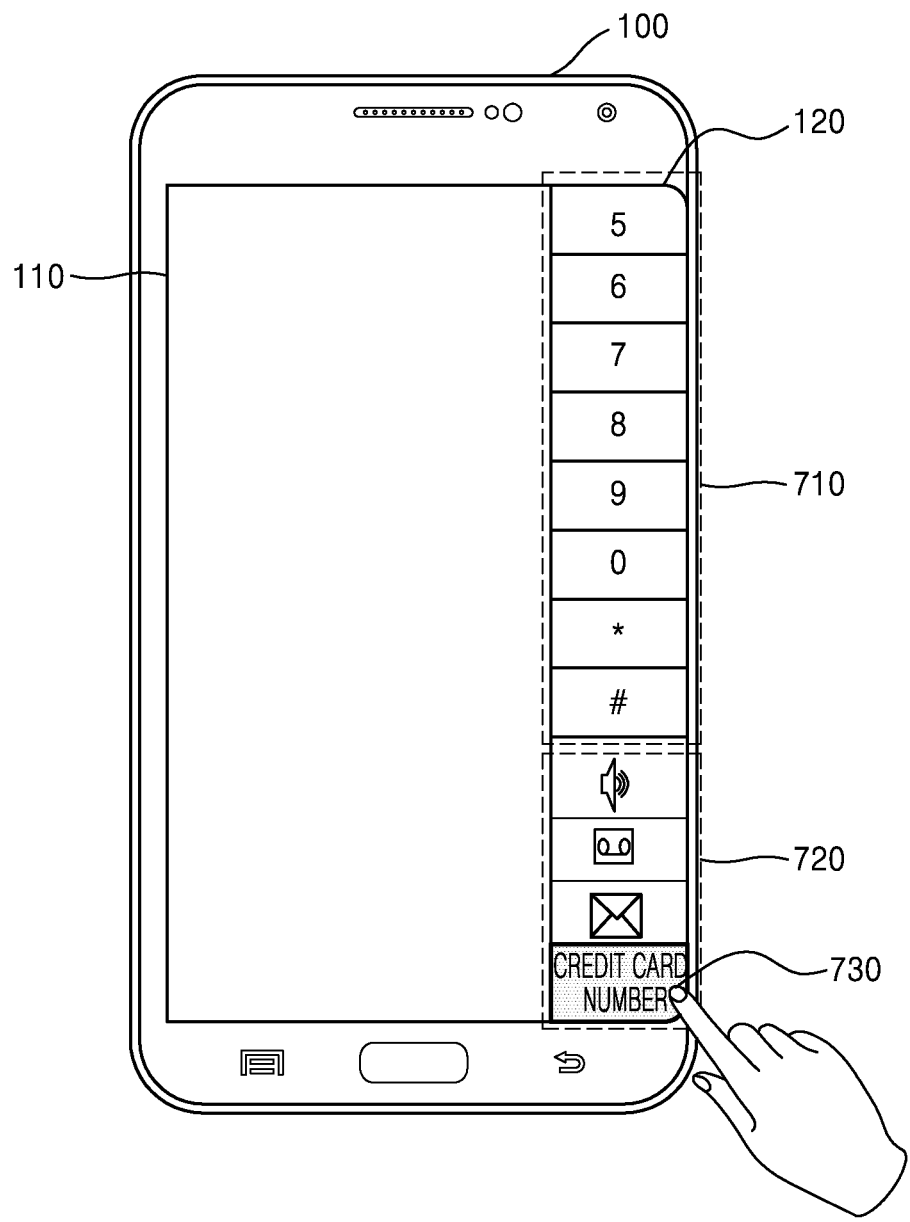
FIG. 7 illustrates an example in which, when a sequence is stored in advance, the sequence is transmitted to a calling partner based on a user's input, according to an exemplary embodiment.

FIG. 7 illustrates an example in which, when a sequence is stored in advance, the sequence is transmitted to a calling partner based on a user's input, according to an exemplary embodiment.

Referring to FIG. 7, during a phone call, a phone call interface may be displayed in the second area 120. The second area 120 may include a text key zone 710 and a function key zone 720. The function key zone 720 may not only include a speaker key, a record key, and a call end key, but also a prestored sequence key 730 such as 'CREDIT CARD NUMBER.'

Also, based on a user's input, content in the shortcut interface may be emphasized in the second area 120. Therefore, content corresponding to the user's input may be clearly displayed in various ways. For example, when the user has pressed the 'CREDIT CARD NUMBER' key 730 in the function key zone 720, the 'CREDIT CARD NUMBER' key 730 may be displayed in a different color or in bold text. However, exemplary embodiments are not limited thereto.

The prestored sequence key refers to a key for inputting a sequence into the mobile device 100. The sequence indicates one or a combination of more than one character. When a sequence is prestored in the mobile device 100, an operation corresponding to the sequence may be performed when the user simply inputs a sequence key, without having to input the sequence every time that is necessary. The sequence may include, but is not limited to, a credit card number, a bank account number, or a password.

For example, suppose that the user has stored, in advance, a credit card number credit card number in the mobile device 100 and a sequence key corresponding to the credit card number sequence in the name 'CREDIT CARD NUMBER'. Then, when the user has to send the credit card number to a calling partner during a phone call, the user does not have to input the credit card number, but may automatically send the credit card number by inputting the ' CREDIT CARD NUMBER' key 730 in the function key zone 720. The user may input the ' CREDIT CARD NUMBER' key 730 by pressing the ' CREDIT CARD NUMBER' key 730 for a long time or touching the ' CREDIT CARD NUMBER' key 730 twice. However, exemplary embodiments are not limited thereto.

Also, during a phone call, when the user inputs a sequence that has not been stored before the phone call, the mobile device 100 may provide an interface for storing the sequence after the phone call.

In order to provide the interface, the mobile device 100 may preset a length of a sequence to be stored, and compare the sequence that has been input during the phone call with the preset length of the sequence. For example, when the length of the sequence that has been input during the phone call is 6 characters and thus exceeds the preset length, the mobile device 100 provides an interface for storing the sequence.

Figure 8A:
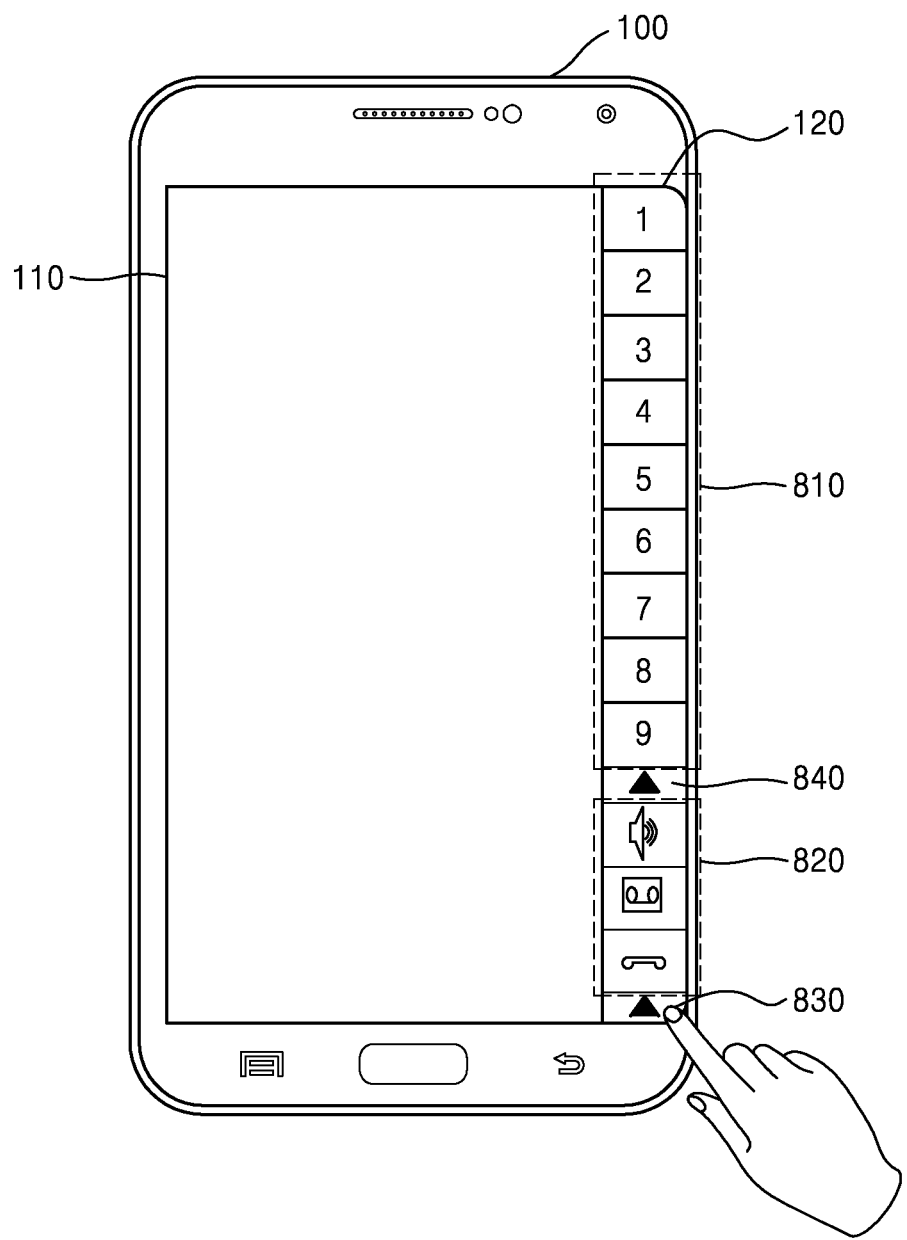
FIGS. 8A and 8B illustrate an example in which a first window and a second window in a second area are enlarged and overlap each other, according to an exemplary embodiment.
Figure 8B:
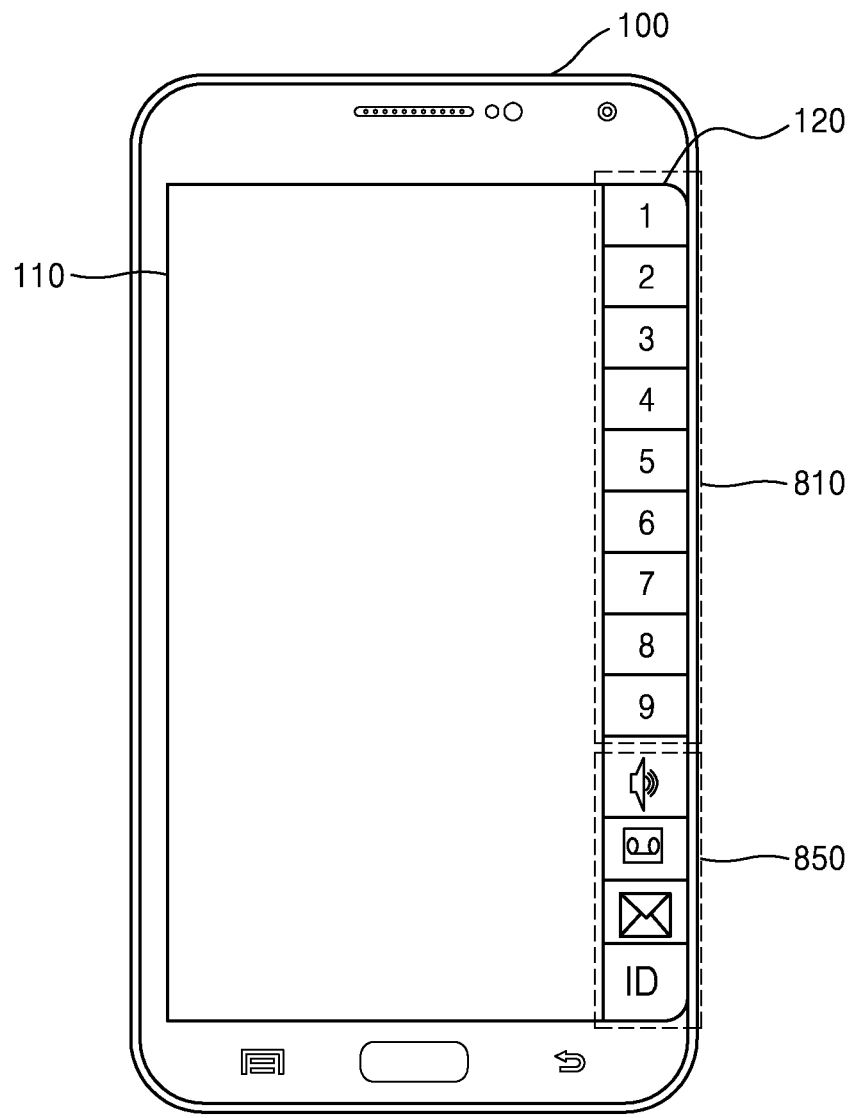

FIGS. 8A and 8B illustrate an example in which a first window 810 and a second window 820 in the second area 120 are enlargeable and overlapping each other, according to an exemplary embodiment.

An enlargeable interface indicates an interface in which a window in the second area 120 may be enlarged according to the user's input. The window may include, but is not limited to, text keys and function keys. For example, as shown in FIG. 8A, text keys may be displayed on a first window 810 and function keys may be displayed on a second window 820. In this case, when the user presses an enlargement key 830 in the second window 820, as shown in FIG. 8B the second window 820 may overlap the first window 810 and more function keys may be displayed.

Alternatively, the text keys and the function keys may be displayed on a window, and an area displaying inputted content may be displayed on another window. However, exemplary embodiments are not limited thereto.

In addition, when a blank space is formed in the second area 120 as windows overlap each other, text that has been previously input by the user may be displayed in the blank space.

Figure 9A:
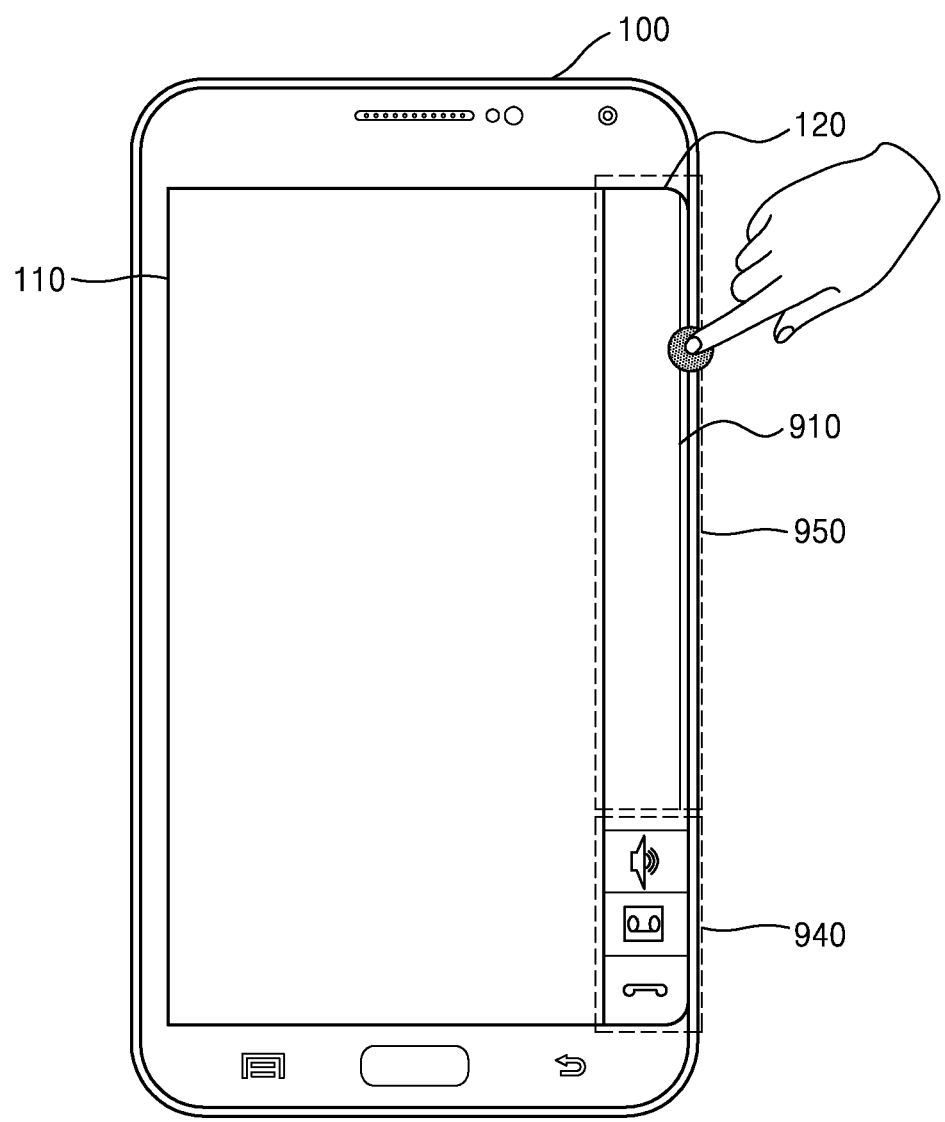
FIGS. 9A and 9B illustrate an example in which an axis hide interface is displayed in a second area based on a user's input, according to an exemplary embodiment.
Figure 9B:
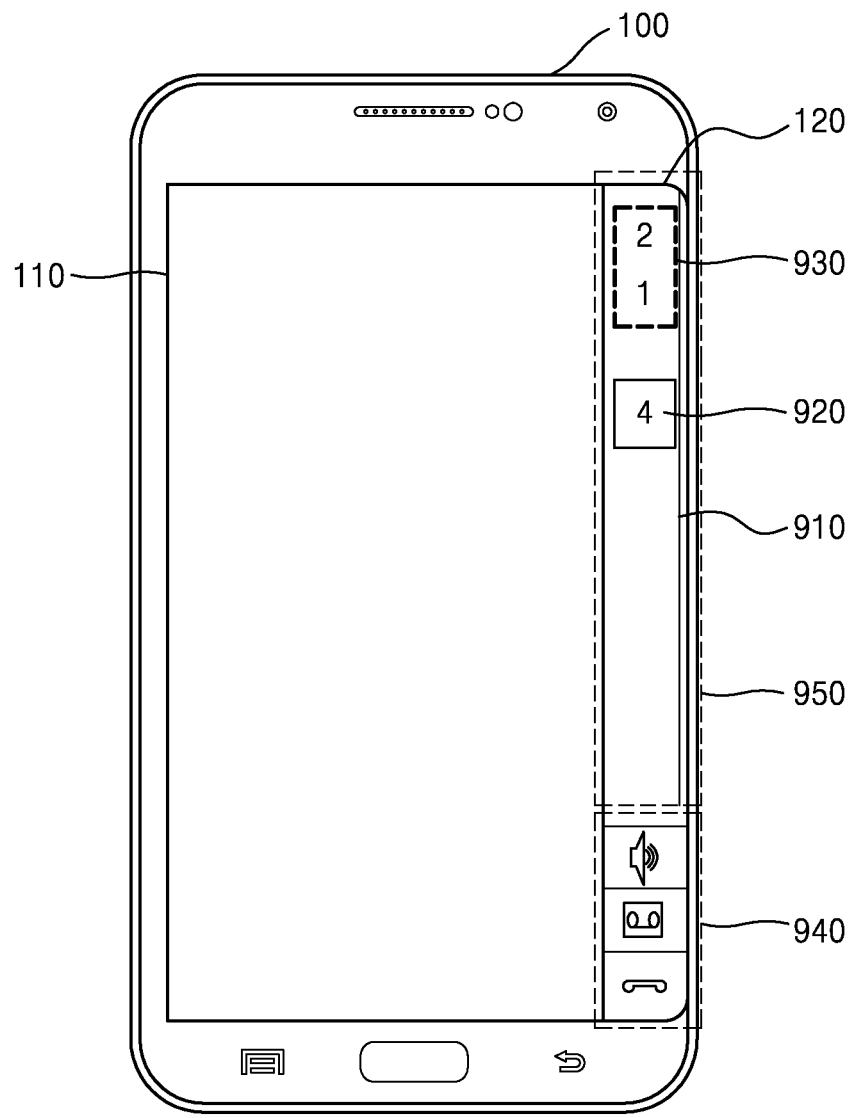

FIGS. 9A and 9B illustrate an example in which an axis hide interface is displayed in the second area 120 based on a user's input, according to an exemplary embodiment.

The axis hide interface indicates an interface in which an axis 910 related to a plurality of operation keys are displayed in the second area 120. Arrangement of the operation keys corresponds to a location of the axis 910. Therefore, according to the user's input, the axis 910 may be changed to at least one of the operation keys and then be displayed. The user's input may include, but is not limited to, touching, sliding, and consecutive touching.

Referring to FIG. 9A, when the axis hide interface is set, the axis 910 and function keys 940 are displayed in the second area 120, and a text key zone 950 is displayed as a blank area. When the user touches a location on the axis 910, as shown in FIG. 9B, text keys that correspond to the touched location are displayed. The displayed text may be emphasized by color change or bold text. However, exemplary embodiments are not limited thereto.

Referring to FIG. 9B, when a location on the axis 910 is touched and a text key corresponding to the touched location is input, the inputted text may be sequentially displayed on a blank area. For example, numbers '2' and '1' 930 displayed in the second area 120 have been input before a number '4' 920 that is currently input. However, the method of displaying inputted numbers is not limited thereto.

Figure 10A:
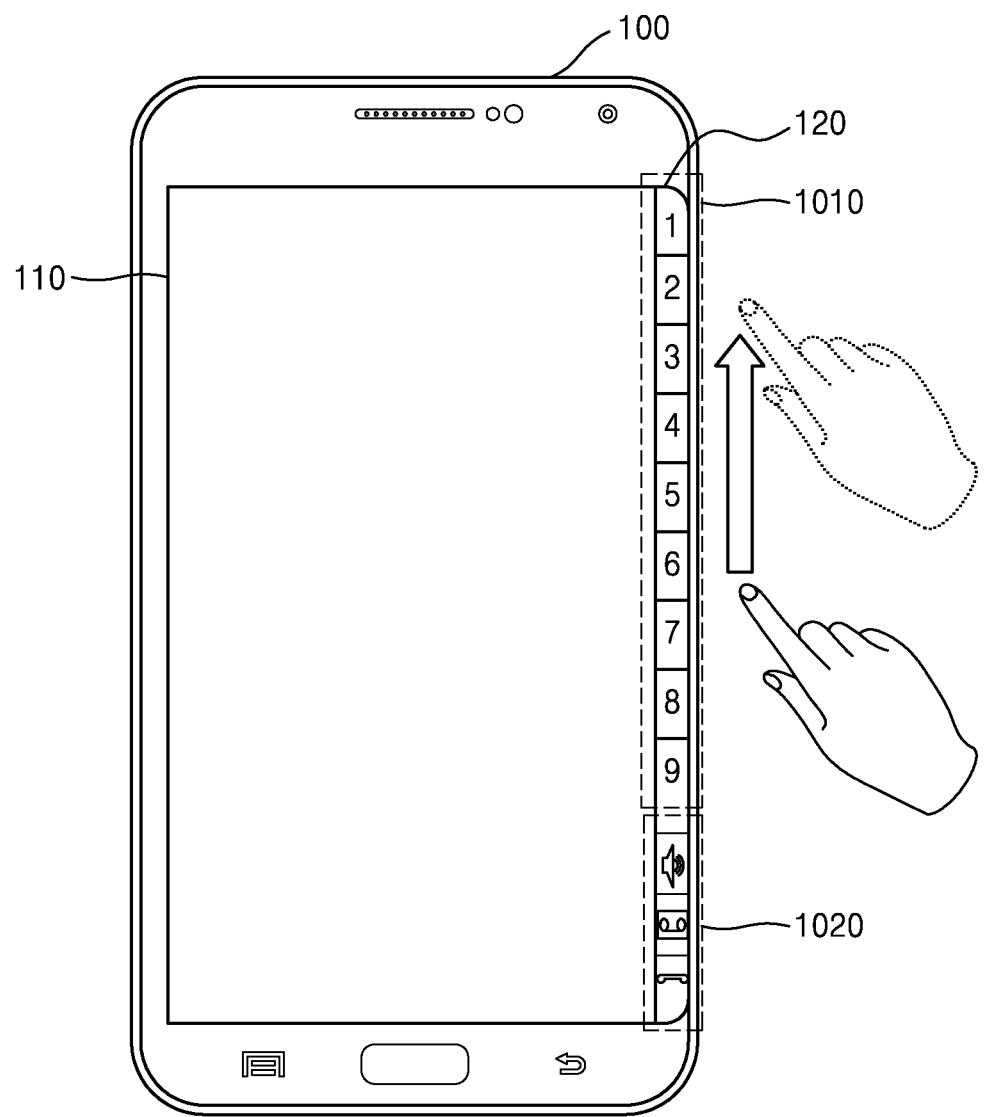
FIGS. 10A and 10B illustrate an example in which an operation key zone is displayed in a second area based on a sliding input of a user, according to an exemplary embodiment.
Figure 10B:
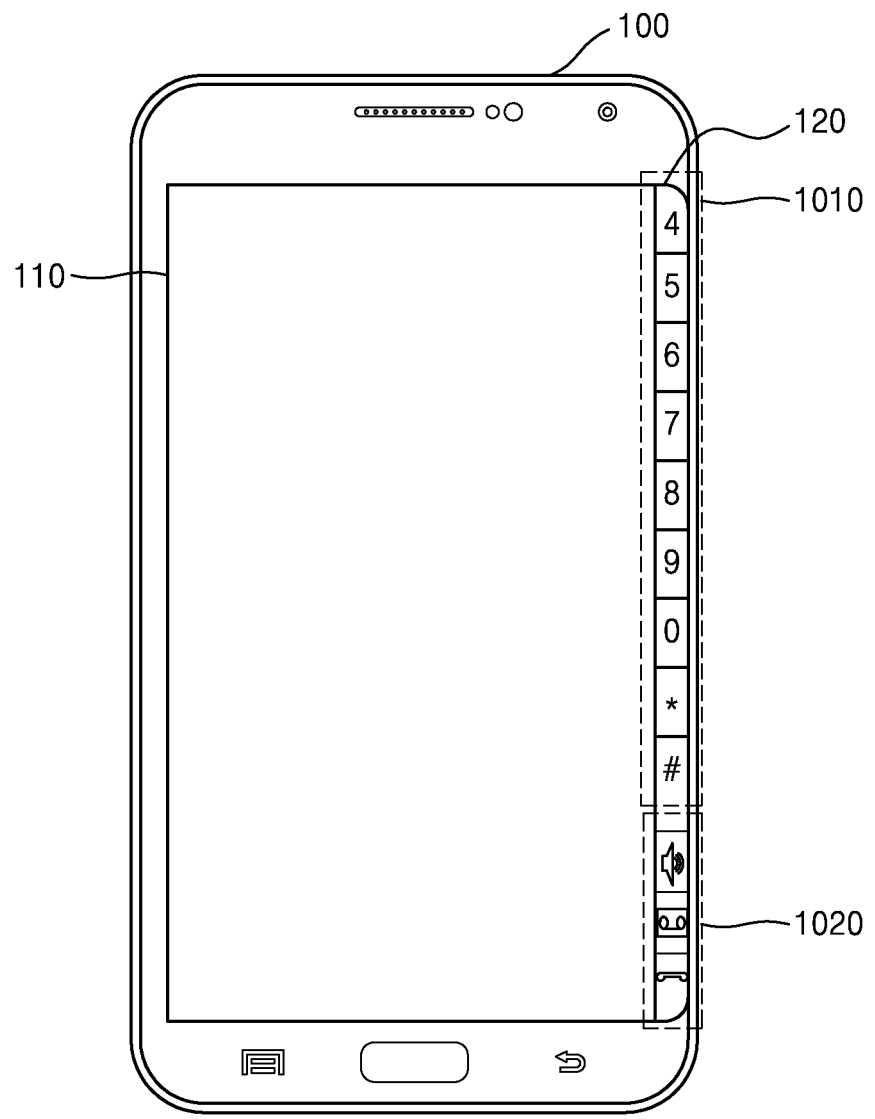

FIGS. 10A and 10B illustrate an example in which an operation key zone is displayed on the second area 120 based on a sliding input of a user, according to an exemplary embodiment.

A slidable interface indicates an interface that is dynamically displayed according to the user who inputs a sliding input on a window in the second area 120. The window may include, but is not limited to, text keys and function keys. The text keys and function keys may be displayed on an identical window or separately displayed on two windows.

Referring to FIG. 10A, numbers 1 to 9 are displayed on a first window 1010, and a speaker key, a record key, and a call end key are displayed on a second window 1020. The first window 1010 is displayed as in FIG. 10B based on a sliding input of the user. Referring to FIGS. 10A and 10B, since text keys and the function keys are displayed in different windows, only the text keys that are in the first window 1010 changes according to the sliding input of the user, and the function keys in the second window 1020 maintain the same state.

Figure 11A:
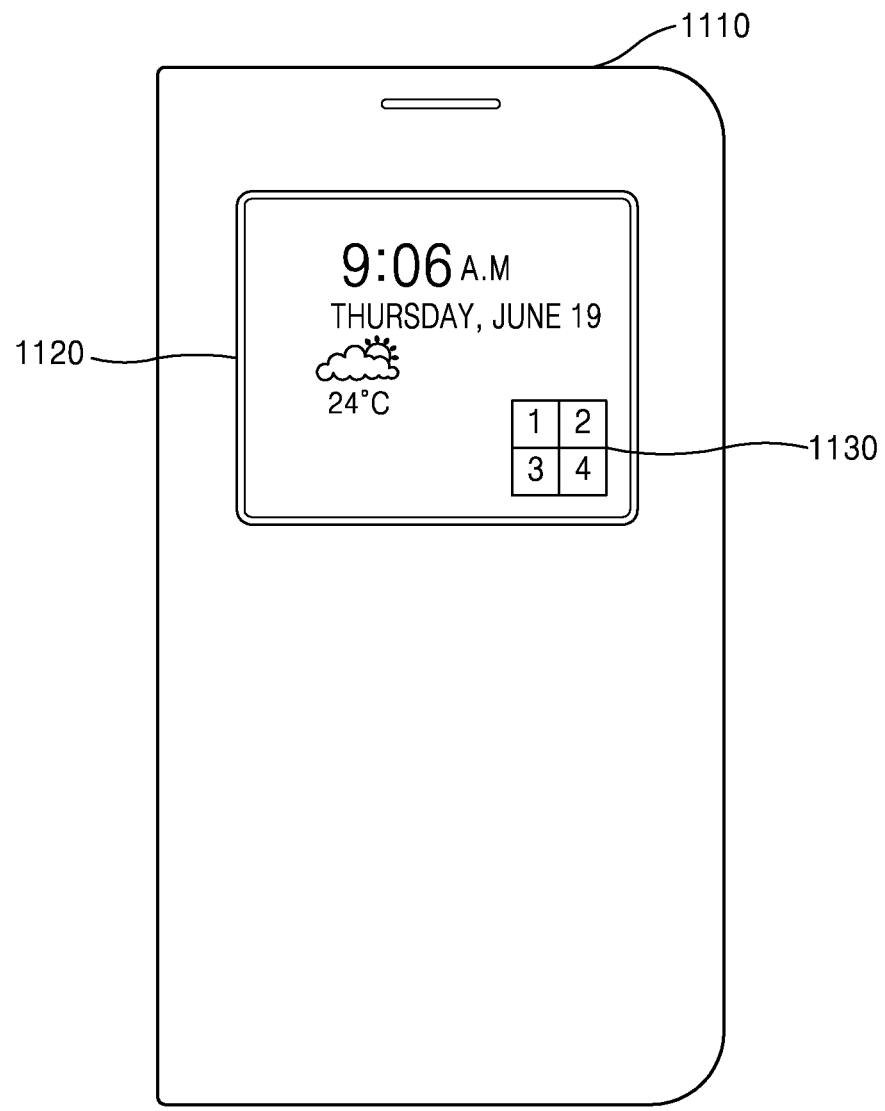
FIGS. 11A and 11B illustrate an example in which, when an area corresponding to a cover is a second area, a keypad is displayed in the second area, according to an exemplary embodiment.
Figure 11B:
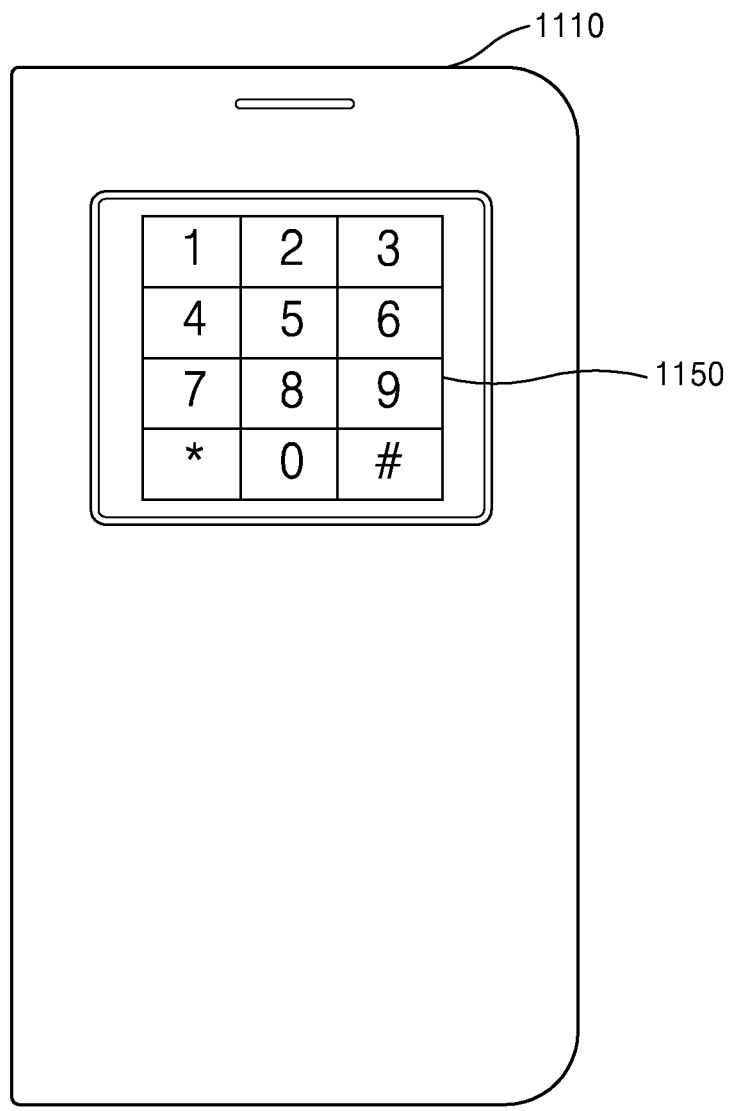

FIGS. 11A and 11B illustrate an example in which, when an area corresponding to a cover is the second area 120, a keypad is displayed in the second area 120, according to an exemplary embodiment.

The present disclosure may not only be applied to the mobile device 100 including a touch screen that has a plurality of areas, but also the mobile device 100 with a cover. For example, in the mobile device 100 with a cover, the second area 120 may correspond to a window 1120 that shows when the cover is closed.

Also, referring to FIG. 11A, a small keypad icon 1130 may be always displayed on the window 1120. Alternatively, as shown in FIG. 11B, an enlarged keypad icon 1150 may be displayed on the window 1120 so that the user may input text.

For example, during a phone call, function keys may be displayed on the window 1120. When not in a phone call state, text keys may be displayed on the window 1120 so that the user may conveniently press a phone number. Therefore, the user may perform functions related to a phone call without having to open the cover.

Figure 12:
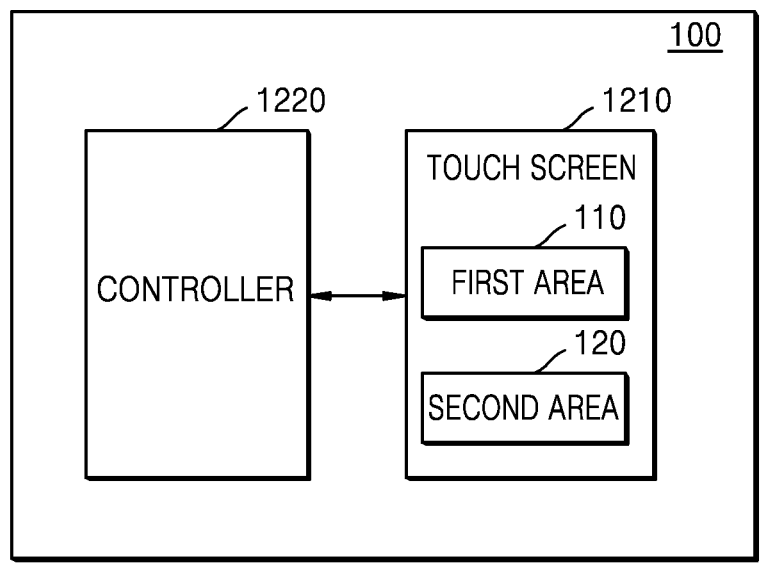
FIG. 12 is a block diagram of a mobile device according to an exemplary embodiment.

FIG. 12 is a block diagram of the mobile device 100 according to an exemplary embodiment.

Referring to FIG. 12, the mobile device 100 includes a touch screen 1210 and a controller 1220. The touch screen 1210 displays an interface, and may include the first and second areas 110 and 120 to receive input function activation signal from the user. The controller 1220 is configured to detect the input function activation signal during a phone call, and display a phone call interface in the second area 120 while maintaining a locked state of the first area 110 of the touch screen 1210.

One or more exemplary embodiments can be implemented through computer-readable code/instructions, such as a computer-executed program module, stored in/on a medium, e.g., a computer-readable medium. The computer-readable medium may be a random computer-accessible medium, and may include volatile media, non-volatile media, separable media and/or non-separable media. Also, the computer-readable medium may correspond to any computer storage media and communication media. The computer storage media includes volatile media, non-volatile media, separable media and/or non-separable media which are implemented by using a method or technology for storing information, such as computer-readable code/instructions, data structures, program modules, or other data. The communication media generally includes computer-readable code/instructions, data structures, program modules, or other transmission mechanisms, and random information transmission media.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling a mobile device, the method comprising:
   based on detecting, by the mobile device, while a main screen area and an edge area of a touch screen display of the mobile device are in a locked state due to an ongoing phone call of the mobile device, at least one of: a face moving away from the mobile device, or an earphone being inserted into the mobile device, maintaining the main screen area in the locked state, unlocking the edge area, and displaying, in the edge area, a first user interface that includes a phone call interface including a plurality of operation keys;
   while the main screen area of the touch screen display is in the locked state, during the ongoing phone call, based on detecting, by the mobile device, that a pen of the mobile device is being pulled out, displaying, in the edge area, a second user interface that includes a handwriting input zone for obtaining a handwriting input; and
   while the main screen area of the touch screen display is in the locked state, during the ongoing phone call, obtaining, by the mobile device, handwritten input information from a user of the mobile device performing a touch operation in the handwriting input zone in the unlocked edge area.

2. The method of claim 1, wherein the main screen area is located on a front surface of the mobile device and the edge area is located on at least one side of the mobile device.

3. The method of claim 1, wherein an obtained memo or text touch input information is displayed in the edge area with emphasis.

4. The method of claim 1, wherein the plurality of operation keys include:
   at least one text key for inputting at least one of: numbers 0 to 9, text or symbols; and
   at least one function key related to the ongoing phone call, wherein the at least one function key related to the ongoing phone call includes at least one of: a speaker key, a call end key or a record key.

5. The method of claim 1, wherein the first user interface displayed in the edge area is adjusted based on at least one of a size of the edge area, a shape of the edge area, or a location of the edge area on the mobile device.

6. The method of claim 1, wherein based on the mobile device being set in a one-hand operation mode, frequently used operation keys from among the plurality of operation keys are distinguishably displayed in the edge area.

7. The method of claim 1, wherein a direction of the first user interface displayed in the edge area changes as the mobile device rotates in a horizontal or vertical direction.

8. The method of claim 5, wherein based on the ongoing phone call being a service call for using a service including a plurality of service menus, the edge area displays a third user interface that includes at least one of text or service content corresponding to the plurality of service menus.

9. The method of claim 8, wherein
   a sequence key is displayed in the edge area, and
   the method further comprises performing an operation corresponding to the sequence key according to a user's input.

10. The method of claim 9, wherein information corresponding to the sequence key is transmitted to a mobile device of a calling partner.

11. The method of claim 1, further comprising: based on the ongoing phone call being an automatic response system (ARS) call, and a full name of service content not being able to be displayed in the edge area at the same time, causing the edge area to scroll the full name of the service content so as to move in a first direction and to be repeatedly displayed.

12. The method of claim 11, further comprising: based on the user selecting one of a plurality of displayed services displayed in the edge area, changing a text key zone of the edge area to subordinate services of the selected service.

13. The method of claim 1, further comprising:
   displaying, in the edge area, an axis hide interface, which is a slidable user interface that dynamically displays different subsets of a combination of text and function keys based on a sliding user input on an axis in the edge area.

14. The method of claim 13, wherein the axis hide interface displays, based on the sliding user input performed by the user on the edge area, a new function or text key that was not being displayed.

15. A mobile device comprising:
a touch screen display having a main screen area and an edge area; and
at least one processor configured to:
based on detecting, while the main screen area and the edge area of the touch screen display are in a locked state due to an ongoing phone call of the mobile device, at least one of: a face moving away from the mobile device, or an earphone being inserted into the mobile device, maintain the main screen area in the locked state, unlock the edge area, and control the touch screen display to display, in the edge area, a first user interface that includes a phone call interface including a plurality of operation keys;
while the main screen area of the touch screen display is in the locked state, during the ongoing phone call, based on detecting that a pen of the mobile device is being pulled out, control the touch screen display to display, in the edge area, a second user interface that includes a handwriting input zone for obtaining a handwriting input; and
while the main screen area of the touch screen display is in the locked state, during the ongoing phone call, obtain handwritten input information from a user of the mobile device performing a touch operation in the handwriting input zone in the unlocked edge area.

16. The mobile device of claim 15, wherein the main screen area and the edge area are physically separated touch screens.

17. The mobile device of claim 15, wherein when the touch screen display is covered by a cover, the edge area corresponds to a window in the cover.

18. A non-transitory computer readable recording medium having recorded thereon a program, which, when executed, controls a mobile device to:
based on detecting, while a main screen area and an edge area of a touch screen display of the mobile device are in a locked state due to an ongoing phone call of the mobile device, at least one of: a face moving away from the mobile device, or an earphone being inserted into the mobile device, maintain the main screen area in the locked state, unlock the edge area, and control the touch screen display to display, in the edge area, a first user interface that includes a phone call interface including a plurality of operation keys;
while the main screen area of the touch screen display is in the locked state, during the ongoing phone call, based on detecting that a pen of the mobile device is being pulled out, control the touch screen display to display, in the edge area, a second user interface that includes a handwriting input zone for obtaining a handwriting input; and
while the main screen area of the touch screen display is in the locked state, during the ongoing phone call, obtain handwritten input information from a user of the mobile device performing a touch operation in the handwriting input zone in the unlocked edge area.

19. The method of claim 1, wherein the plurality of operation keys include at least one phone call function key related to the ongoing phone call.

* * * * *